United States Patent
Park et al.

(10) Patent No.: US 9,467,242 B2
(45) Date of Patent: Oct. 11, 2016

(54) SYSTEM AND METHOD FOR PRODUCING AN ELECTRONIC PROGRAM GUIDE FOR USER-CREATED CONTENT

(75) Inventors: Ho Yeon Park, Seoul-si (KR); Jun-Hyung Kim, Suwon-si (KR); Sung-Oh Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 782 days.

(21) Appl. No.: 12/627,892

(22) Filed: Nov. 30, 2009

(65) Prior Publication Data

US 2011/0131598 A1    Jun. 2, 2011

(51) Int. Cl.
| | | |
|---|---|---|
| *H04N 7/16* | (2011.01) | |
| *H04N 5/445* | (2011.01) | |
| *H04H 60/72* | (2008.01) | |
| *H04N 21/262* | (2011.01) | |
| *H04N 21/462* | (2011.01) | |
| *H04N 21/2362* | (2011.01) | |
| *H04N 21/2668* | (2011.01) | |
| *H04N 21/2743* | (2011.01) | |
| *H04N 21/434* | (2011.01) | |
| *H04N 21/482* | (2011.01) | |

(52) U.S. Cl.
CPC .......... *H04H 60/72* (2013.01); *H04N 21/2362* (2013.01); *H04N 21/2668* (2013.01); *H04N 21/26283* (2013.01); *H04N 21/2743* (2013.01); *H04N 21/4345* (2013.01); *H04N 21/4622* (2013.01); *H04N 21/4821* (2013.01)

(58) Field of Classification Search
CPC .................. H04N 21/26283; H04N 21/4622
USPC ..................................................... 725/25, 46
See application file for complete search history.

(56) References Cited

U.S. PATENT DOCUMENTS

| | | | | |
|---|---|---|---|---|
| 6,769,127 | B1* | 7/2004 | Bonomi et al. | 725/39 |
| 7,509,324 | B2* | 3/2009 | Burr et al. | |
| 2002/0104099 | A1* | 8/2002 | Novak | 725/136 |
| 2004/0111756 | A1* | 6/2004 | Stuckman et al. | 725/142 |
| 2005/0198317 | A1* | 9/2005 | Byers | 709/228 |
| 2006/0156409 | A1* | 7/2006 | Chladek | 726/26 |
| 2006/0242201 | A1* | 10/2006 | Cobb et al. | 707/104.1 |
| 2007/0124781 | A1* | 5/2007 | Casey et al. | 725/94 |
| 2007/0199025 | A1* | 8/2007 | Angiolillo et al. | 725/47 |

(Continued)

FOREIGN PATENT DOCUMENTS

| | | |
|---|---|---|
| KR | 100866197 | 10/2008 |
| KR | 10-0885261 | 2/2009 |

(Continued)

OTHER PUBLICATIONS

Korean Office Action dated Jul. 1, 2016 issued in counterpart application No. 10-2012-7013004, 11 pages.

*Primary Examiner* — Pankaj Kumar
*Assistant Examiner* — Franklin Andramuno
(74) *Attorney, Agent, or Firm* — The Farrell Law Firm, P.C.

(57) ABSTRACT

A system and method are provided for producing a personalized Electronic Program Guide (EPG), that includes a content server for receiving from a content producer a request for upload of content, transmitting to the content producer a request for information related to the content, receiving from the content producer the content and the information related to the content, and generating a personalized EPG from the content and the information related to the content.

12 Claims, 4 Drawing Sheets

(56) References Cited

U.S. PATENT DOCUMENTS

| | | |
|---|---|---|
| 2008/0049941 A1 | 2/2008 | Kim et al. |
| 2008/0098032 A1* | 4/2008 | Wu .............................. 707/104.1 |
| 2008/0250108 A1* | 10/2008 | Levy ............................ 709/206 |
| 2008/0276276 A1 | 11/2008 | Lim et al. |
| 2009/0150936 A1 | 6/2009 | Lee et al. |
| 2009/0170609 A1 | 7/2009 | Kang et al. |
| 2009/0249396 A1* | 10/2009 | Cheng et al. ................... 725/39 |
| 2010/0251306 A1* | 9/2010 | Oh .................................. 725/51 |
| 2011/0231487 A1* | 9/2011 | Zhang et al. ................. 709/203 |

FOREIGN PATENT DOCUMENTS

| | | |
|---|---|---|
| KR | 1020090037791 | 4/2009 |
| KR | 1020090089523 | 8/2009 |

* cited by examiner

SYSTEM AND METHOD FOR PRODUCING AN ELECTRONIC PROGRAM GUIDE FOR USER-CREATED CONTENT

BACKGROUND OF THE INVENTION

1. Field of the Invention

The present invention relates to User-Created Content (UCC), and in particular to a system and method for producing and distributing an Electronic Program Guide (EPG) for the UCC.

2. Description of the Related Art

Typical broadcast systems (i.e. service providers) provide content to subscribers. Commercial content producers typically produce the content provided to the subscribers of the broadcast systems. In order for a subscriber to locate content that is of interest to the subscriber, the service provider provides the subscriber with an Electronic Program Guide (EPG). The EPG contains information describing the content, for example, viewing times, length of content, if content is downloadable and if so, a Uniform Resource Link (URL) of the content, the names or entities that produced the content, copyright information, etc. The commercial content producers typically provide the copyright information and/or security mechanisms with the commercial content to protect the content from unlawful use. The service providers broadcast the commercial content along with the copyright information and/or security mechanisms to ensure that the commercial content is protected from unlawful uses. A content user would normally consult the EPG to locate content and then request the content from the service provider.

With the onset of advanced personal media technology, non-commercial content producers are producing non-commercial content, commonly referred to as User-Created Content (UCC). UCC is generally produced for sharing amongst individual users for non-commercial purposes. Generally, non-commercial content producers (i.e. UCC producers) create UCC without any identifying information, thus when an EPG is generated, the UCC will not have any descriptive information associated therewith. Current service providers do not distinguish between the commercial content and UCC when gathering and distributing the various content. Thus, unless a producer of the UCC is knowledgeable enough to produce the UCC to contain copyright information and/or security mechanisms, the UCC will be distributed without any identifying information. Thus, a content user would have difficulty in locating interesting UCC, and since the EPG would not contain information identifying the owner of the UCC, the UCC could be subject to uses that are beyond the intent of the UCC producer.

One current method of identifying and managing content is through the use of metadata. Metadata is commonly referred to as data about data, and can be data, in any format (e.g. voice, text, image, etc.), that describes the content. For example, metadata can provide the content name, the content size, the data format of the content, the data structure of the content, etc. Metadata is currently used to identify all types of content including images, text, video, web pages, and the like. Many EPG systems incorporate at least some of the metadata supplied with the content into the EPG to facilitate searching and identifying content.

As the amount of content being provided by service providers increases, new technology is being developed to facilitate the collection and distribution thereof. Web 2.0 is one such new technology being utilized to collect and distribute UCC over the Internet. However, with the vast increase in the amount of UCC available on the Internet, it is becoming more and more difficult to search for user-specific content.

In addition, although UCC distribution is rapidly increasing, there are no standards to protect the copyright and usage rights of the UCC. Thus, the current state of UCC distribution lends itself to unlawful distribution and postings of UCC, along with great difficulty in maintaining proprietary rights connected with the UCC.

Accordingly, there exists a need for a standard to collect and distribute UCC, and a need for a standard to protect the proprietary rights of UCC.

SUMMARY OF THE INVENTION

In order to overcome at least the problems in the prior art, the present invention provides a system and method for producing and distributing a personalized Electronic Program Guide (EPG) for User-Created Content (UCC) based on content sharing information.

The present invention also provides a system and method for producing a personalized EPG for UCC based on metadata of the UCC.

The present invention also provides a system and method for producing a personalized EPG for UCC that enables a service provider to collect, process and distribute the UCC.

In accordance with an embodiment of the present invention, provided is an apparatus for producing a personalized EPG, including a content server for receiving from a content producer a request for upload of content, transmitting to the content producer a request for information related to the content, receiving from the content producer the content and the information related to the content, and generating a personalized EPG from the content and the information related to the content.

In accordance with another embodiment of the present invention, provided is a method in a service provider for producing a personalized EPG, including receiving from a content producer a request for upload of content; transmitting to the content producer a request for information related to the content; receiving from the content producer the content and the information related to the content; and generating a personalized EPG from the content and the information related to the content.

In accordance with another embodiment of the present invention, provided is a method of using by a service user a personalized EPG, including receiving from a service provider a personalized EPG containing metadata and content producer input information associated with content listed in the personalized EPG; transmitting to the service provider a request for content selected from the personalized EPG; and receiving the content from the service provider, wherein the content producer input information contains at least one of information identifying the content producer and information describing the authorized uses of the content.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE INVENTION

Figure 1:
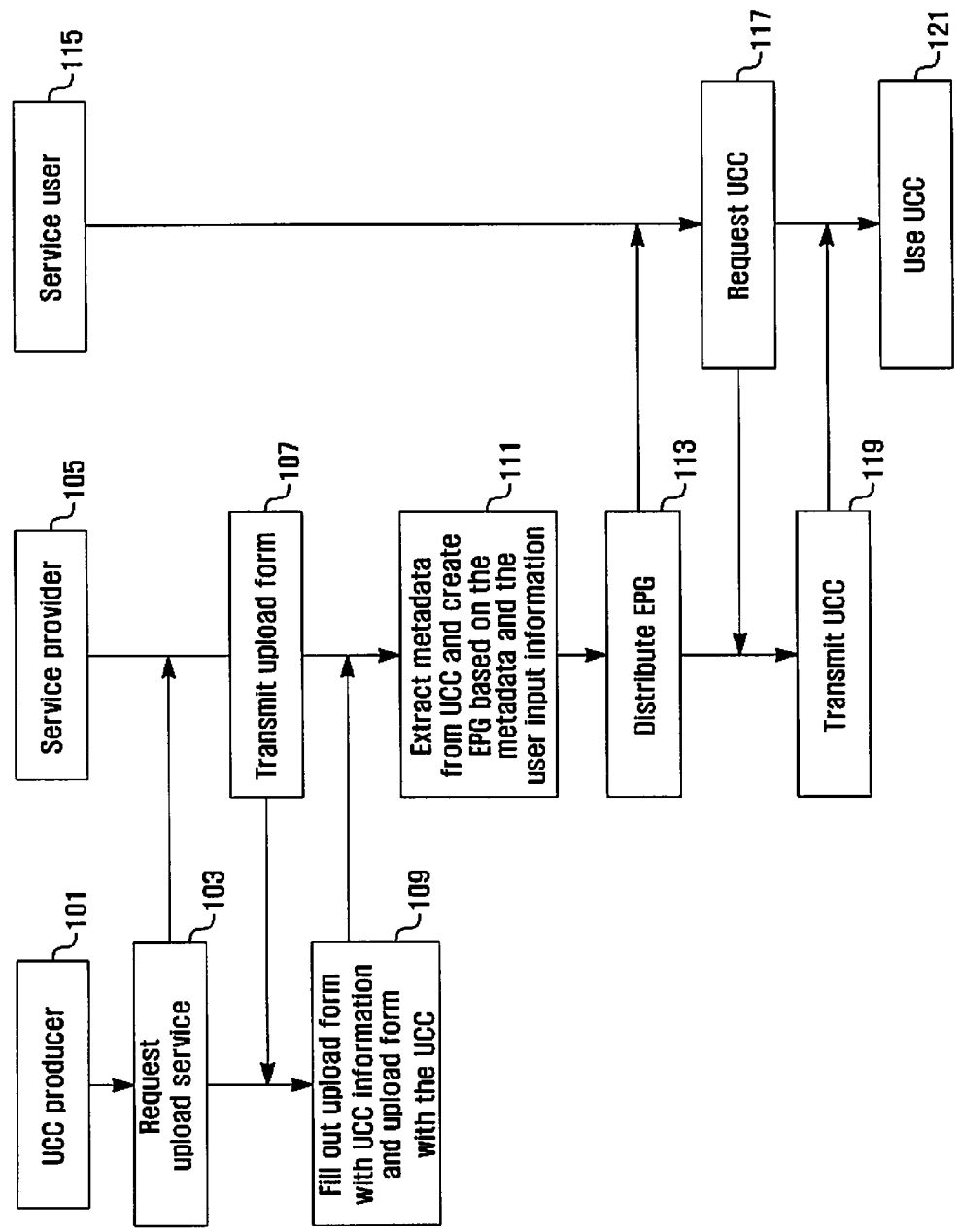
FIG. 1 is a flow diagram illustrating the collection, processing and distribution of User-Created Content (UCC) with a personalized Electronic Program Guide (EPG) in a system according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents. It is to be understood that the singular forms "a," "an," and "the" include plural referents unless the context clearly dictates otherwise. Thus, for example, reference to "an identifier" includes reference to one or more of such identifiers.

For example purposes, the present invention will be described herein in terms of the Open Internet Protocol TeleVision (IPTV) Forum (OIPF) and Digital Video Broadcasting-Convergence Broadcast Multicast Service (DVB-CBMS) standards. Although these standards are used herein to describe the present invention, the present invention is not limited to these standards, and can be applied to similar technology based systems.

FIG. 1 is a flow diagram illustrating the collection, processing and distribution of User-Created Content (UCC) with a personalized Electronic Program Guide (EPG) according to an embodiment of the present invention. As illustrated in FIG. 1, at 103 a UCC producer 101 sends a request for an upload service of a UCC to a service provider 105. More than one UCC producer 101 can be accommodated. The service provider 105 provides for the distribution of the content, which can include both UCC and commercial content. At 107 the service provider 105 transmits an upload form to the UCC producer 101 in response to the request for the upload service. Upon receipt of the upload form, at 109 the UCC producer 101 fills out the upload form with user input information describing the UCC and transmits the completed upload form, along with the UCC, back to the service provider 105. Metadata that is included with the UCC is also uploaded with the UCC. Upon receipt of the completed upload form and the UCC, at 111 the service provider 105 extracts the user input information from the upload form and extracts the metadata from the UCC. The service provider 105 uses the user input information and the metadata to generate an EPG. An EPG that includes at least some of the metadata and user input information is referred to as a personalized EPG. An example of the user input information and metadata is shown in Table 1.

TABLE 1

| Field | Semantics |
|---|---|
| Title | Title of the content |
| MediaTitle | File name of the content |
| ServiceRef | Service ID of a Service Fragment related to the content |
| Synopsis | Brief outline of the content |
| Keyword | Words describing the nature of the content |
| Genre | Featured style of the content |
| ContentType | Type of the content (e.g. download, streaming, etc.) |
| ParentalGuidance | Maturity level of the content |
| Language | Menu language |
| CaptionLanguage | Subtitle language |
| SignLanguage | Sign language information |
| CreditsList | Names of actor(s), producer(s), etc. |
| RelatedMaterial | Supplementary information related to the content |
| Duration | Playback time of the content |
| PrivateData | Private information related to the content |
| contentID | Identifier of the content |
| ContentUsage | Purpose of the content (commercial, UCC, etc.) |
| Ownership | Ownership information of the content |
| ShareInfo | Sharing information about the content |
| TargetUserID | Identification information for a specific intended user |

The metadata can be provided in the Electronic Service Guide (ESG) format specified in the Digital Video Broadcasting (DVB) standard; other formats are also contemplated.

At 113 the service provider 105 distributes the EPG to a service user 115. More than one service user 115 can be accommodated. The service user 115 reviews the EPG to select content to view. At 117 the service user 115 transmits a request for a specific UCC selected from the EPG. The EPG generated using the metadata and user input information provides the service user 115 with a convenient method for searching and identifying UCC that is of interest to the service user 115. Upon receipt of the UCC request, at 119 the service provider transmits the UCC to the service user 115. At 121 the service user 115 can use the UCC. Since the EPG contains the user input information and metadata, the service user 115 can access the user input information and metadata to ensure lawful viewing and distribution of the UCC.

Figure 2:
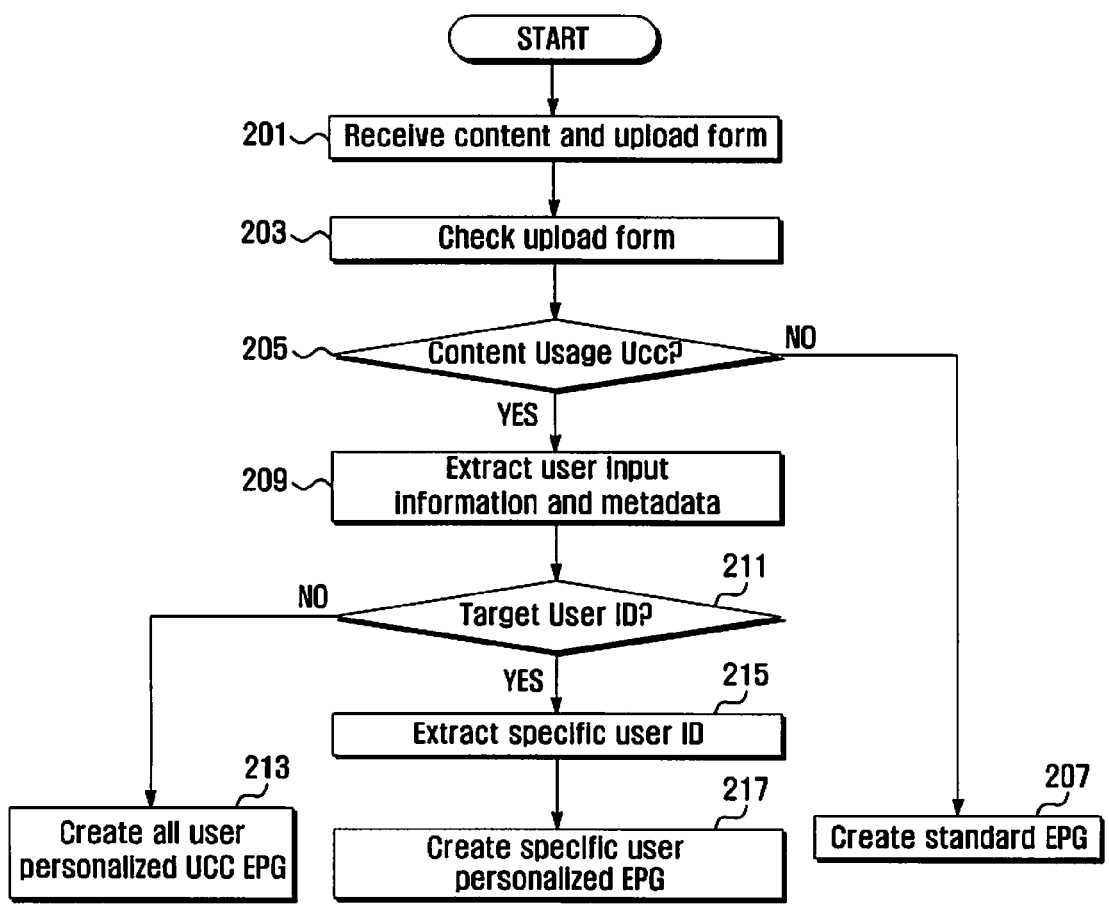
FIG. 2 is a flowchart illustrating a method for producing an EPG according to an embodiment of the present invention.

FIG. 2 is a flowchart illustrating a method in a service provider for producing an EPG according to an embodiment of the present invention. In step 201 the service provider receives content and an upload form from a UCC producer. In step 203 the service provider checks the upload form received with the content. In step 205 the service provider determines whether the content is UCC, based on the value of the ContentUsage field of the upload form. If the ContentUsage value is set to a value indicating that the content is not UCC, the process goes to step 207 to create a standard EPG of the content using known EPG generation procedures.

On the other hand, if the ContentUsage value is set to a value indicating that the content is UCC, in step 209 the service provider extracts the user input information from the upload form and the metadata from the UCC, e.g. the service provider extracts information contained in the Ownership and ShareInfo fields. In step 211 the service provider checks for identification information for an intended specific user in the TargetUserID field. If the TargetUserID field indicates that no specific user is identified, in step 213 the service provider creates all user personalized UCC EPG. On the other hand, if the TargetUserID field indicates that a specific user is identified, in step 215 the service provider extracts the specific user identification from the TargetUserID field. In step 217 the service provider creates specific user personalized UCC EPG. Thus, by utilizing the user input information and metadata, the service provider can provide detailed and user specific UCC EPG. In addition, the specific user personalized UCC EPG can be sent to only the specific user identified therein.

Figure 3:
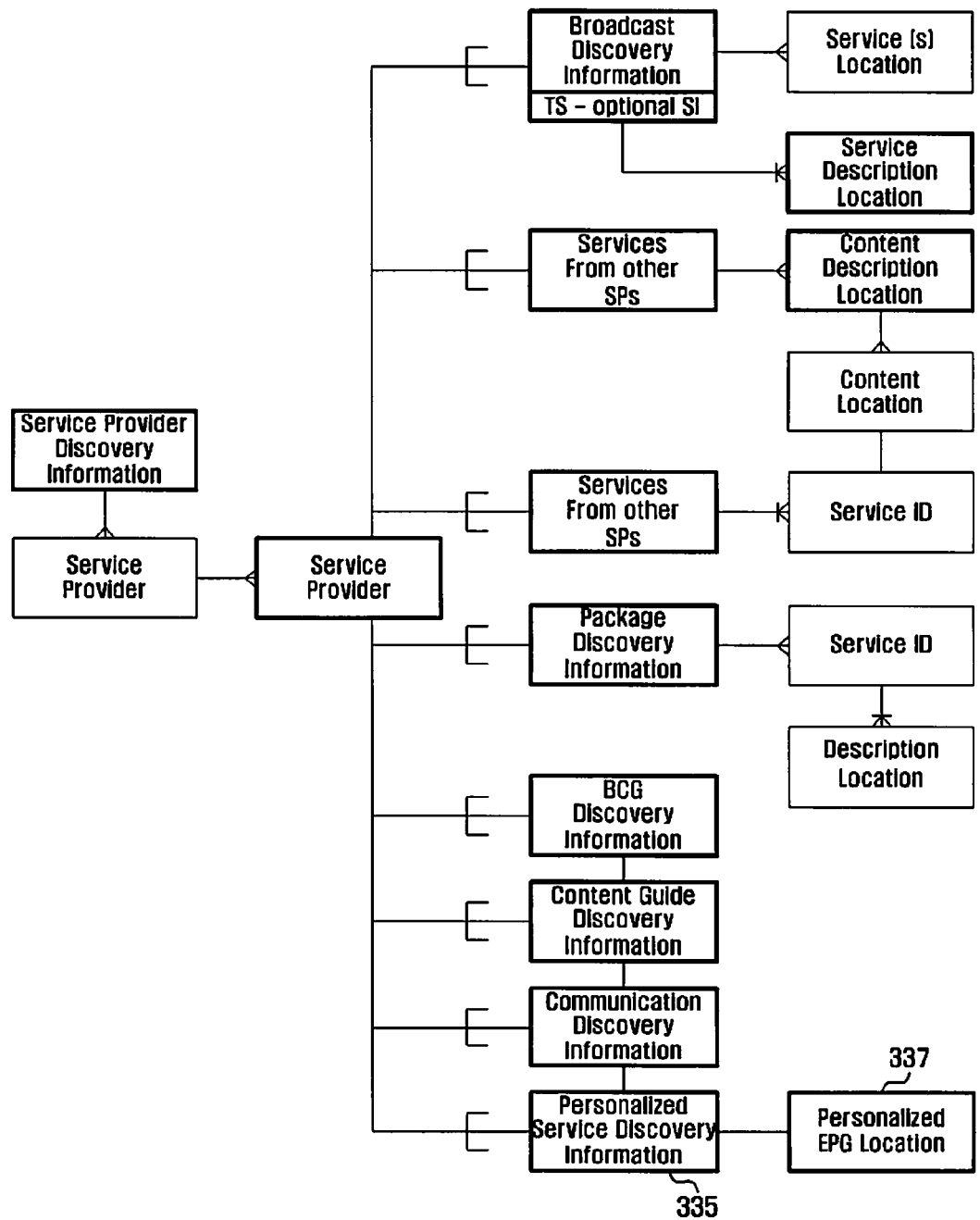
FIG. 3 is a block diagram illustrating a Service Discovery & Selection (SD&S) data model for distributing a personalized EPG according to an embodiment of the present invention.

FIG. 3 is a block diagram illustrating a Service Discovery & Selection (SD&S) data model for distributing a personalized EPG according to an embodiment of the present invention. FIG. 3 is a data model based on the OIPF standard, but other standard based systems, for example DVB, are contemplated. The OIPF SD&S data refers to the ETSI TS 102 034, V1.3.1 DVB, Transport of MPEG-2 TS Based DVB Services over IP Based Networks standard. The data model in FIG. 3 is similar to that of the OIPF data model except for the Personalized Service Guide (PSG) Discovery Information element 335 and the Personalized EPG Location element 337 are added by the present invention. The Personalized Service Guide Discovery Information element 335 and the Personalized EPG Location element 337 are utilized to incorporate the user input information and metadata of the UCC into a personalized EPG. The Personalized Service Guide Discovery Information element 335 provides, among other information, the Uniform Resource Locator (URL) of the UCC, and the Personalized EPG Location element 337 provides the content information as defined in Table 1.

Table 2 sets forth the information contained in the Personalized Service Guide Discovery Information element 335 of FIG. 3. The information fields of Table 2 are formatted based on the broadband content guide of the DVB standard; other formats are contemplated.

TABLE 2

| Element/Attribute Name | Element/Attribute Description |
| --- | --- |
| PSGOfferingtype | PSG Discovery |
| PSG | PSG record |
| PSG@Id | ID of Personalized service guide, allocated by service provider |
| PSG@Version | Version information |
| Name | Name of personalized service guide |
| Description | Description on personalized service guide |
| Log | Logo for personalized service guide |
| Type | Type of personalized guide |
| TargetProvider | Domain name of service provider |
| TargetUserID | Personalized EPG user |
| TransportMode | Location of personalized service guide |
| DVBSTP | Location indication using DVB Service Transport Protocol (STP) |
| http@Location | Location indication using URL |
| http@SOAP | Location indication using SOAP protocol |
| PSGProviderName | Name of PSG provider |

As shown in Table 2, the TargetUserID filed is included to indicate the specific user to which the UCC is directed. A service user who receives the Personalized Service Guide Discovery Information element 335 can utilize the TargetUserID to receive the user specific UCC.

Figure 4:
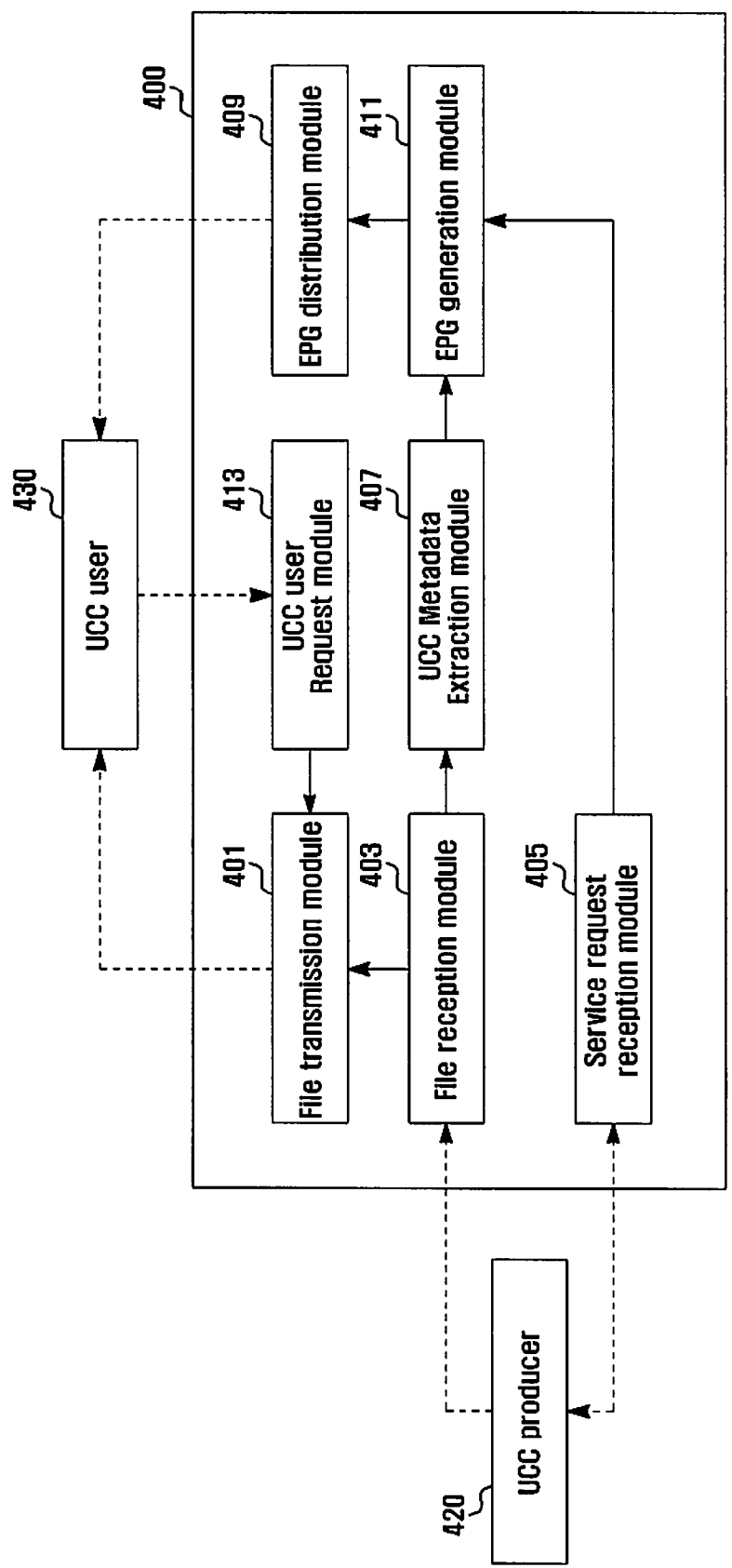
FIG. 4 is a block diagram illustrating a system including a UCC server of a service provider for providing UCC services using a personalized EPG according to an embodiment of the present invention.

FIG. 4 is a block diagram illustrating a system including a UCC server of a service provider for providing UCC services using a personalized EPG according to an embodiment of the present invention. The system shown in FIG. 4 includes UCC server 400, UCC producer 420 and UCC user 430. The system can accommodate more than one UCC producer 420 and more than one UCC user 430. The UCC server 400 includes a file transmission module 401, a file reception module 403, a service request reception module 405, a user input information and metadata extraction module 407, an EPG distribution module 409, an EPG generation module 411, and a UCC user request module 413. The service request reception module 405 receives and processes a request for a UCC upload service from the UCC producer 420. That is, the service request reception module 405 receives a request for upload service from the UCC producer 420 and transmits the upload form to the UCC producer. After completing the upload form, the UCC producer transmits the completed upload form to the service request reception module 405. The service request reception module 405 authenticates and authorizes the UCC producer 420 and collects the user input information from the completed upload form about the UCC content from the UCC producer 420. The file reception module 403 receives the UCC file itself transmitted from the UCC producer 420. The metadata extraction module 407 extracts the metadata from the UCC. The EPG generation module 411 receives the user input information from the service request reception module 405 and the metadata from the metadata extraction module 407 and generates an EPG. By analyzing the ContentUsage filed and the TargetUserID filed, the EPG generation module 411 can create a standard EPG or create an all user or user specific personalized EPG. The EPG distribution module 409 receives the generated EPG from the EPG generation module 411 and distributes the EPG to the UCC user 430. After the UCC user selects a UCC from the EPG, the UCC user 430 transmits a UCC request to the UCC user request module 413. The UCC user request module 413 instructs the file transmission module 401 to transmit the requested UCC to the UCC user 430. The UCC user 430 can now use the UCC according to the user input information and metadata to protect the rights of the UCC producer 420.

As described above, the EPG production and distribution system and method of the present invention allows a service provider to create personalized EPG for UCC using user input information and metadata, thereby enabling the searching and identifying of the UCC, identifying ownership of the UCC, and protecting against unlawful copying, use and distribution of the UCC.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. An apparatus for producing a personalized Electronic Program Guide (EPG), comprising:
    a transceiver for receiving from a content producer a request message for uploading a content, transmitting to the content producer a response message for information related to the content in response to the request message, receiving from the content producer the content and the information related to the content including content usage information inputted by the content producer, and transmitting the personalized EPG to at least one service user authorized to use the content; and
    a controller for determining whether the content is a user-created content (UCC) based on the content usage information, generating the personalized EPG based on the content and the information related to the content when the content usage information indicates that the content is the UCC created by the content producer, generating a standard EPG when the content usage information indicates that the content is not the UCC, and identifying an authorized service user based on the information related to the content, and
    wherein the information related to the content is generated by the content producer, and wherein the information related to the content comprises information identifying the at least one service user.

2. The apparatus of claim 1, wherein the at least one service user is determined when the information related to the content is generated by the content producer.

3. The apparatus of claim 1, wherein the transceiver receives a request for the content from the at least one service user, and transmits the content to the at least one service user.

4. The apparatus of claim 1, wherein the information related to the content comprises at least one of information indentifying the content producer and information describing authorized uses of the content preset by the content producer.

5. A method in a service provider for producing a personalized Electronic Program Guide (EPG), the method comprising:
receiving from a content producer a request message for uploading a content;
transmitting to the content producer a response message for information related to the content in response to the request message;
receiving from the content producer the content and the information related to the content including content use information inputted by the content producer;
determining whether the content is a user-created content (UCC) based on the content usage information;
generating the personalized EPG based on the content and the information related to the content when the content usage information indicates that the content is the UCC created by the content producer;
generating a standard EPG when the content usage information indicates that the content is not the UCC;
identifying an authorized service user based on the information related to the content; and
transmitting the personalized EPG to at least one service user authorized to use the content,
wherein the information related to the content comprises information for identifying the at least one service user.

6. The method of claim 5, wherein the at least one service user is determined when the information related to the content is generated by the content producer.

7. The method of claim 5, further comprising:
receiving a request for the content from the at least one service user; and
transmitting the content to the at least one service user.

8. The method of claim 5, wherein the information related to the content includes at least one of information identifying the content producer and information describing authorized uses of the content preset by the content producer.

9. An apparatus of a content producer for uploading content, the apparatus comprising:
a transceiver for transmitting, to a content server, a request message for uploading a content, receiving, from the content server, a response message for information related to the content in response to the request message, and transmitting, to the content server, the content and information related to the content including content usage information inputted by the content producer; and
a controller for generating the information related to the content including the content usage information for identifying whether the content is a user-created content (UCC) and information for identifying at least one service user authorized to use the content,
wherein the content and the information related to the content is used, by the content server, for generating a personalized Electronic Program Guide (EPG) when the content usage information indicates that the content is the UCC created by the content producer, generating a standard EPG when the content usage information indicates that the content is not the UCC, and transmitting the personalized EPG to the authorized at least one service user.

10. The apparatus of claim 9, wherein the information related to the content comprises:
ownership information of the content; and
sharing information of the content.

11. A method for uploading content, the method comprising:
transmitting, to a content server, a request message for uploading a content;
receiving, from the content server, a response message for information related to the content in response to the request message;
generating information related to the content including the content usage information for identifying whether the content is a user-created content (UCC) and information for identifying at least one service user authorized to use the content; and
transmitting, to the content server, the content and the information related to the content,
wherein the content and the information related to the content is used, by the content server, for generating a personalized Electronic Program Guide (EPG) when the content usage information indicates that the content is the UCC created by the content producer, generating a standard EPG when the content usage information indicates that the content is not the UCC, and transmitting the personalized EPG to the authorized at least one service user.

12. The method of claim 11, wherein the information generated by the content producer includes ownership information of the content, and sharing information of the content.

* * * * *